Sept. 11, 1934. R. R. WEBBER 1,973,030
VEHICLE
Filed April 11, 1932 2 Sheets-Sheet 1
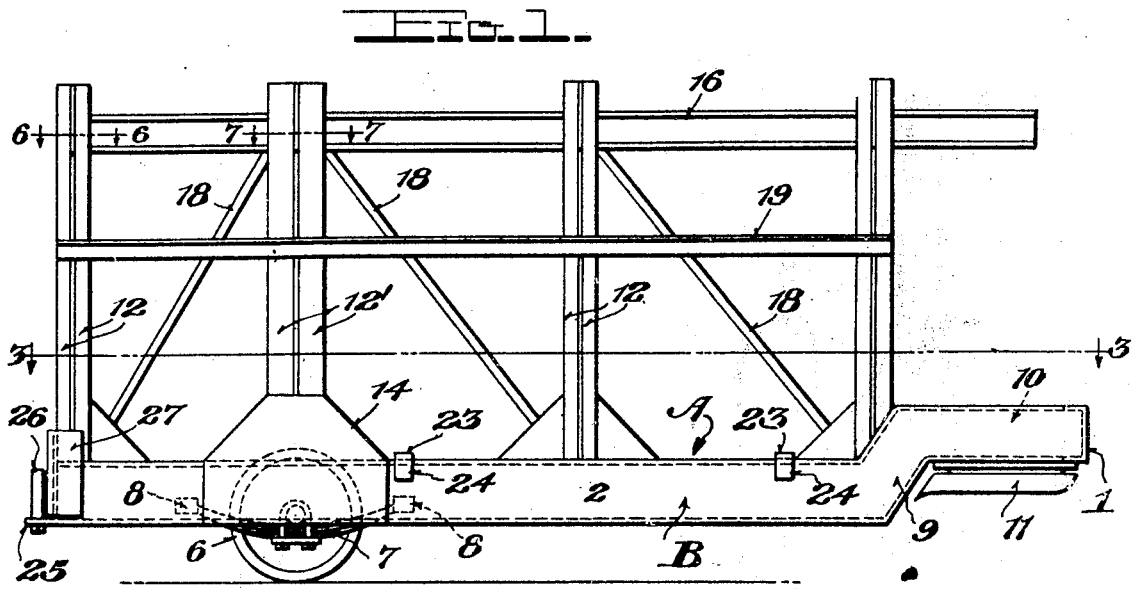
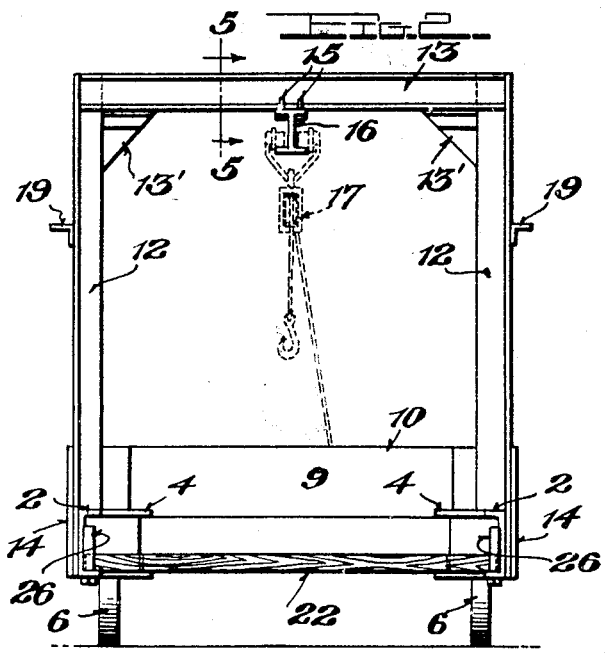
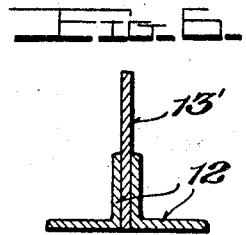
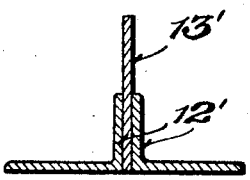
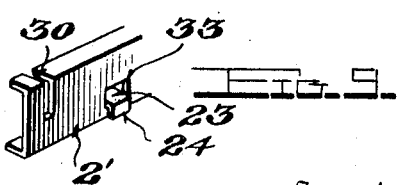
Inventor
*Ray R. Webber,*
By *William T. Geier*
Attorney Sept. 11, 1934.  R. R. WEBBER  1,973,030
VEHICLE
Filed April 11, 1932  2 Sheets-Sheet 2
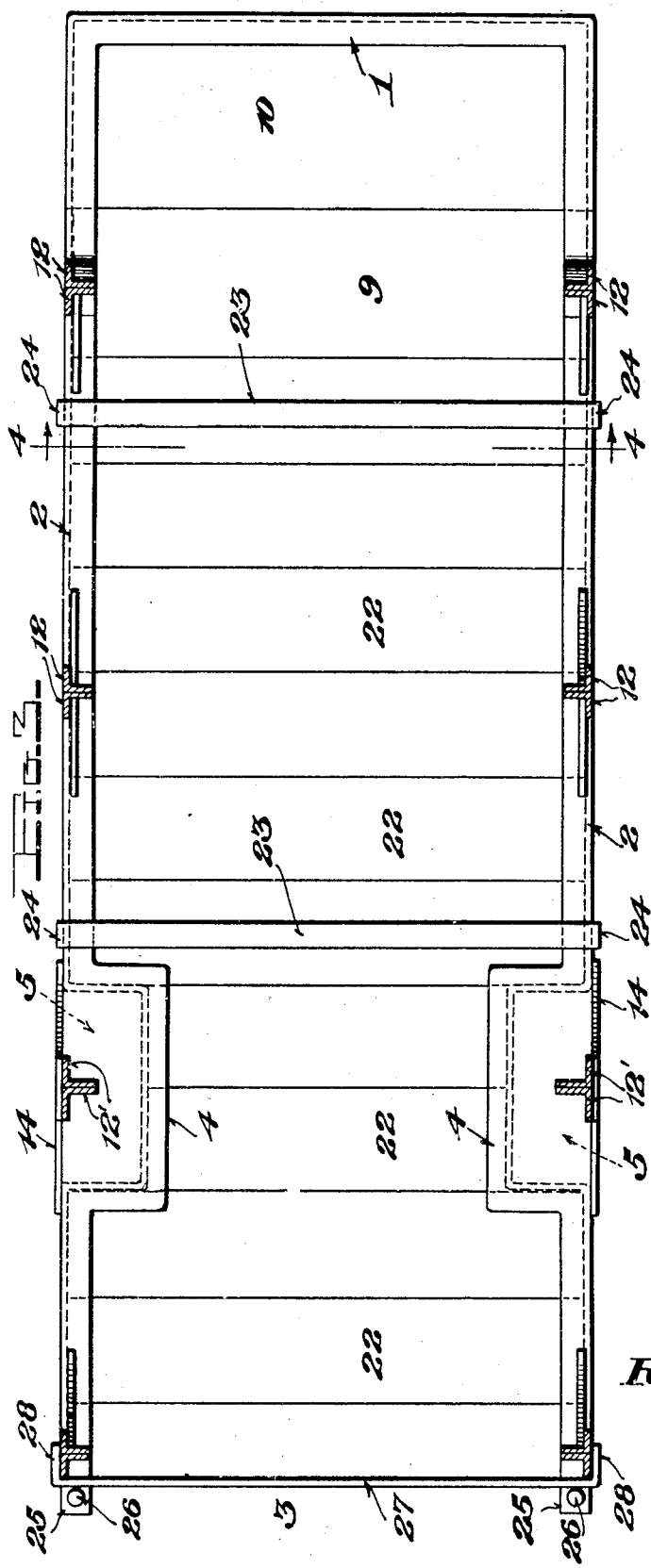
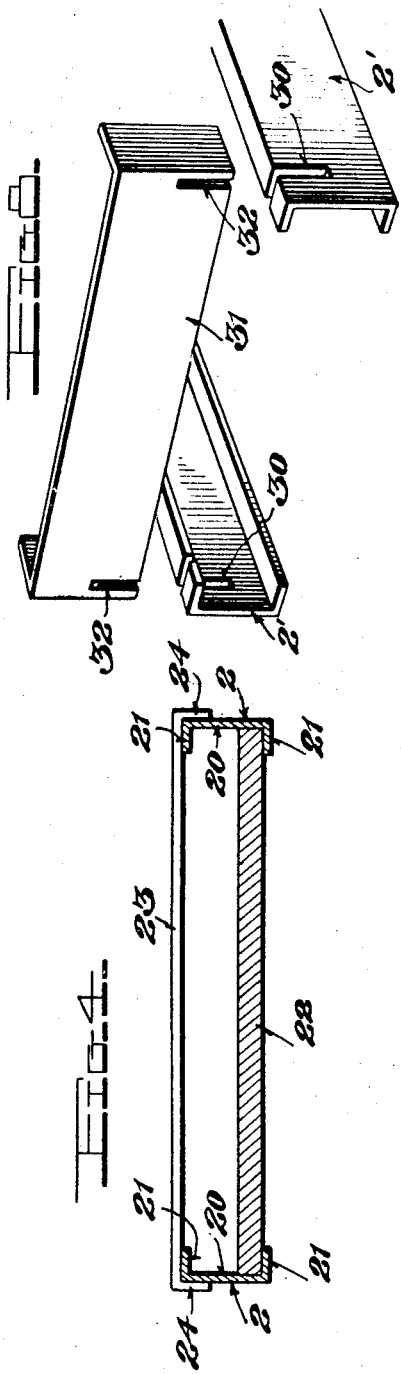
Ray R. Webber, Inventor Patented Sept. 11, 1934

1,973,030

UNITED STATES PATENT OFFICE 1,973,030

VEHICLE

Ray R. Webber, Cleveland, Ohio, assignor of one-third to Hugo W. Grunwald, Cleveland, Ohio Application April 11, 1932, Serial No. 604,628

11 Claims. (Cl. 214—65)

This invention relates to improvements in vehicles and more particularly to those of the self-loading and unloading type.

The primary object of this invention is to provide a vehicle of the above character having a hoisting apparatus connected therewith and so located on the body as to entirely eliminate the necessity of loading the vehicle over the sides or ends of the latter.

Another important object of this invention is to provide a vehicle of the above character in which the handling of material, when loading or unloading the latter, is entirely within the confines of the vehicle.

Another important object of this invention is to provide a vehicle of the above character having a normally open bottom through which the load is raised or lowered.

Another important object of this invention is to provide a vehicle of the above character which is so constructed as to permit the same to be initially disposed over a load at a point at which the latter is to be carried in the vehicle, after the load is elevated into the vehicle, thus eliminating subsequent shifting of the load ordinarily necessary to balance and centralize the same to meet various road conditions encountered during transportation.

Another important object of this invention is to provide a vehicle of the above character having means for elevating the load to be carried through the normally open bottom of the vehicle, and the provision of removable floor-boards which are adapted to entirely support the load when the vehicle is in transit, thereby removing all strain from the elevating means.

Another important object of this invention is to provide an open bottomed vehicle of the above character having removable floor-boards for supporting a load, and removable means for bracing said vehicle to relieve the latter of varying stresses and strains of normal road conditions encountered during transportation.

Still another important object of this invention is to provide a vehicle of the above character which is of simple construction, efficient in use, and one which may be manufactured at a reasonable cost.

These and other objects and advantages will be apparent from the following description and accompanying drawings, in which Figure 1 is a side elevation of the improved vehicle, Figure 2 is a rear elevation of the same, Figure 3 is a view taken on line 3—3 of Fig. 1, showing the vehicle bottom in plan, with the removable floor-boards in their load carrying position, and one form of combined end-gate and frame brace, Figure 4 is a sectional view on line 4—4 of Fig. 3, showing the side frames of the vehicle and one of a series of intermediate brace members for the latter, Figure 5 is a fragmentary and sectional view on line 5—5 of Fig. 2, disclosing the trackway for the hoisting apparatus and the supporting means therefor, Figure 6 is a sectional view on line 6—6 of Fig. 1, Figure 7 is a sectional view on line 7—7 of Fig. 1, Figure 8 is a fragmentary perspective view of a modified form of combined end-gate and brace for the side frames, and Figure 9 is a fragmentary perspective view of a modified form of brace member for the side frames of the vehicle.

Referring in detail to the drawings, A indicates generally a vehicle having a chassis B formed of a one-piece inwardly facing channeled steel beam or the like. The chassis is of substantially rectangular configuration, when viewed in plan, and is provided with a closed front end 1, side frames 2, and an open rear end 3. The side frames 2 are bent inwardly adjacent their rear ends, as at 4, to provide a pair of spaced opposed recesses 5, each of which latter are adapted to receive a stub axle, not shown, for supporting a traction wheel 6. Each of the stub axles and wheels are supported by leaf springs 7, the latter being connected to the side frames as at 8, in any suitable manner.

At a predetermined distance rearwardly of the front end of the chassis, the side frames 2 are inclined upwardly and forwardly as at 9 and terminate in a platform 10 to provide a support for one-half of a fifth wheel 11, said platform being disposed above, but in the same plane as the side frames 2, whereby to permit the vehicle to be readily connected or coupled with a power tractor unit, not shown.

Extending vertically from each of the side frames 2 and connected to the latter, as by welding, is a series of spaced pairs of standards 12 alined with similar standards of the opposite series. Each pair of opposed standards together form vertical supports for each of a series of horizontally arranged transversely extending beams 13, as shown in Fig. 2, connected and braced at their point of juncture by a triangular webbed plate 13', the latter having a portion disposed between and secured to the standards 12 by welding or the like. One pair of standards 12' are mounted over each of the recesses 5 and are connected to the side frames by plates 14, the latter forming closures for the open sides of the recesses.

Extending longitudinally of the vehicle and connected to the transverse beams 13, by fasteners 15, is an I-beam 16, forming a trackway or guide for a suitable ambulant hoisting apparatus 17, the latter being shown in dotted lines, in Fig. 2.

A plurality of diagonally disposed members 18 connect the side frames 2 and the vertical standards 12 and 12' on each side of the vehicle, while the vertical standards are further strengthened by a horizontally extending bar 19 secured to their outer side faces, whereby to provide a vehicle body having a substantially rigid superstructure.

Removably positioned between the side frames 2, and extending into the opposed inwardly facing channels 20 formed by the upper and lower flanges 21 of the side frames, is a series of transversely arranged floor boards 22 adapted to form a closure for the open bottom of the vehicle. Disposed over the floor-boards and detachably connecting the side frames 2, are a plurality of spaced brace members 23 having downwardly turned ends 24 to prevent movement of the side frames in a direction away from each other, while movement of the side frames toward each other is prevented by the transverse positioning of the floor-boards.

Each of the side frames adjacent the open rear end of the vehicle is provided with a rearwardly projecting part 25 to which is secured, by any suitable means, a vertically extending pin 26 spaced a predetermined distance from the adjacent vertical standard 12. Positioned transversely across the open rear end of the vehicle and between the pins 26 and adjacent standards 12, is a removable combined end-gate and brace 27 having its opposite free ends 28 disposed at substantially right-angles thereto and engaging the side frames to further brace the vehicle and to prevent outward movement of said side frames.

In Figure 8 of the drawings, is disclosed a modified form of a combined end-gate and brace for the open rear end of the vehicle. The side frame 2' are each provided adjacent their rear ends with a vertical kerf or slot 30 extending part way therethrough. The end-gate 31, is also provided with corresponding similar kerfs or slots 32, the bottom walls of which being adapted to seat upon the corresponding bottom walls of the slots 30, whereby to prevent movement of the side frames 2' toward or away from each other when the end-gate is placed in operative position.

Figure 9 of the drawings, discloses a modified form of securing the intermediate braces 23 in position, and in which each of the side frames 2' is formed with a series of spaced openings 33 alined with similar openings in the opposite side frame. In this form, the downturned ends 24 of the braces 23 are projected through the openings 33 and engage the outer faces of the side frames 2'.

In the operation of the vehicle, the end-gate 27, braces 23 and floor-boards 22 are first removed from the side frames 2. The vehicle is then backed over the load to the approximate point within the vehicle at which the same is to be carried. This initial maneuvering of the vehicle, eliminates subsequent shifting of the load in order to balance the vehicle to accommodate the latter to varying road conditions.

After the vehicle has been properly positioned over the load, the latter is elevated through the open bottom by means of the hoisting apparatus 17 to a point within the vehicle and above the side frames 2. While the load is still retained in such elevated position, the floor-boards are disposed between the side frames to close the open bottom of the vehicle. The intermediate braces 23 and endgate 27 are then placed in their proper positions, whereupon the load is lowered until the same rests upon and is solely supported by the floor-boards, thus entirely relieving the hoisting apparatus of all stresses and strains incidental to subsequent transportation of the load.

Upon reaching its destination, the vehicle is moved to the place where the load is to be deposited and the operation is then reversed, viz: the load is elevated and retained above the floor-boards, the latter together with the braces and end-gate are removed and the load is then lowered to its proper position on the ground, through the open bottom of the vehicle. A vehicle constructed and operated in accordance with the foregoing has particular utility in the moving and placing of heavy objects, such as, machinery, packing cases or the like. However, it is to be noted that same may be readily adapted to the expedious handling of other loads or materials.

It is to be expressly understood that various modifications of the invention may be resorted to within the spirit and scope of the invention as announced by the following claims, the various forms of the invention herein described being merely by way of illustration and are not an exhaustive enumeration of all ways by which the invention may be practiced.

What is claimed is:

1. A vehicle of the character described comprising a body having traction means and having an open bottom, hoisting means connected to said body above the open bottom and operable within the body for raising and lowering material thereinto, and removable supports connected to said open bottom, whereby to support said material independently of the hoisting means when the vehicle is in transit.

2. A self loading and unloading vehicle of the character described, comprising a body having traction means and having an open bottom, hoisting means supported within the confines of said body and above said open bottom for raising a load therethrough, removable floor-boards transversely disposed across said open bottom and between the sides of the body for supporting the load independently of the hoisting means when the vehicle is in transit, and removable brace means connecting the sides of the body above the floor-boards, whereby to prevent separation of the sides of the frame under loads of varying weights.

3. A vehicle of the character described, comprising a body having traction means and having its bottom and one end open, a hoisting apparatus supported by the body above the bottom thereof, removable floor-boards adapted to close the open bottom of the body and being arranged to prevent movement of the sides of the latter toward each other, and a plurality of transversely disposed spaced brace members connecting the sides of the body to prevent movement of the latter away from each other, said hoisting apparatus being located so as to elevate a load through said open bottom of the body and said floor-boards being adapted to support said load independently of the hoisting apparatus whereby to remove the strain from the latter when the vehicle is in transit.

4. The hereindescribed method of transporting materials and the like, which resides in positioning a carrier having an open bottom over and in vertical register with the material to be transported, then in elevating the material directly through and above the open bottom and into the carrier from points above the material so as to place and distribute the weight of the material in the carrier by a single movement of the material, and finally in supporting the material against downward movement through the open bottom from and within the carrier, thereby to transfer the weight of the material from the elevating means to the supporting means.

5. A vehicle of the character described, comprising a body having traction means and having an open bottom, hoisting means connected to said body above the open bottom and operable within the body for raising and lowering material thereinto, and a movable support engaging said body and bridging the open bottom, whereby to support said material independently of the hoisting means.

6. A vehicle of the character described, comprising a body having traction means and having an open bottom, hoisting means associated with the body for raising material through said open bottom, and a movable support associated with said body whereby to support said material independently of the hoisting means.

7. A vehicle of the character described, comprising a body having traction means and having an open bottom, hoisting means associated with the body for raising material through said open bottom, and a movable support associated with said body whereby to support said material independently of the hoisting means and above the lowermost plane of the bottom of the vehicle.

8. A vehicle of the character described, comprising a body having traction means and having an open bottom, hoisting means associated with the body for raising material through and above said open bottom, and means for supporting the material in substantially the plane of the bottom of the vehicle and against downward movement independently of said hoisting means.

9. A vehicle of the character described, comprising a body having traction means and having an open bottom, hoisting means connected to said body above the open bottom and operable within the body for raising and lowering material thereinto, and means for supporting the material in substantially the plane of the bottom of the vehicle and against downward movement independently of said hoisting means.

10. A load transporting vehicle of the character described, comprising a body having traction means and having an open bottom, hoisting means associated with the vehicle and operable through the open bottom thereof and engageable with the load at points above the surface upon which the load is supported for raising the load into a plane substantially coincident with the plane of the bottom of the vehicle, and means for supporting the load in its said raised position independently of the hoisting means.

11. A load transporting vehicle of the character described, comprising a body having traction means and having an open bottom, hoisting means connected to the vehicle and operable through the open bottom thereof and engageable with the load at points above the surface upon which the load is supported for raising the load into a plane substantially coincident with the plane of the bottom of the vehicle, and means for supporting the load in its said raised position independently of the hoisting means.

RAY R. WEBBER.